US011914717B2

(12) United States Patent
Robison et al.

(10) Patent No.: US 11,914,717 B2
(45) Date of Patent: Feb. 27, 2024

(54) INFORMATION HANDLING SYSTEMS AND RELATED METHODS TO CRYPTOGRAPHICALLY VERIFY INFORMATION HANDLING SYSTEM PLATFORM COMPONENTS AND TRACK EVENTS ASSOCIATED WITH THE PLATFORM COMPONENTS

(71) Applicant: DELL PRODUCTS L.P., Round Rock, TX (US)

(72) Inventors: Charles D. Robison, Buford, GA (US); Shekar B. Suryanarayana, Bangalore (IN); Srikanth S. Krishnamurthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 285 days.

(21) Appl. No.: 17/477,355

(22) Filed: Sep. 16, 2021

(65) Prior Publication Data
US 2023/0084956 A1   Mar. 16, 2023

(51) Int. Cl.
*G06F 21/57* (2013.01)
*H04L 9/06* (2006.01)
(Continued)

(52) U.S. Cl.
CPC .......... *G06F 21/575* (2013.01); *H04L 9/0643* (2013.01); *H04L 9/0861* (2013.01); *H04L 9/3236* (2013.01); *G06F 2221/034* (2013.01)

(58) Field of Classification Search
CPC ............. G06F 21/575; G06F 2221/034; H04L 9/0643; H04L 9/0861; H04L 9/3236
See application file for complete search history.

(56) References Cited

U.S. PATENT DOCUMENTS 8,335,938 B2 * 12/2012 Orr ....................... G06F 1/3287
713/323
8,839,451 B1 * 9/2014 Lam ....................... G06F 21/10
713/193
(Continued)

OTHER PUBLICATIONS

Microsoft Docs, "Get Started With Remote Debugging Windows 10 Devices", Mar. 2021, 10 pgs.
(Continued)

*Primary Examiner* — Zahid Choudhury
(74) *Attorney, Agent, or Firm* — Egan, Enders & Huston LLP.

(57) ABSTRACT

The present disclosure provides various embodiments of information handling systems and related methods to generate a cryptographic key, which may be used to cryptographically verify information handling system (IHS) platform components and track events associated with the platform components. In the embodiments disclosed herein, a wide variety of platform-related information may be collected from a plurality of system platform components and embedded into a single cryptographic key. Once a cryptographic key is generated, it may be decoded and/or compared with cryptographic key(s) subsequently generated by the IHS to securely verify the system platform components, determine if changes have been made to the system platform components, facilitate system diagnostics and/or perform additional functions.

20 Claims, 8 Drawing Sheets

(51) Int. Cl.
  *H04L 9/32*    (2006.01)
  *H04L 9/08*    (2006.01)

(56) References Cited

U.S. PATENT DOCUMENTS

| | | | |
|---|---|---|---|
| 2009/0210723 A1* | 8/2009 | Yoshida | G06F 21/57 |
| | | | 713/189 |
| 2021/0266184 A1 | 8/2021 | Robison | |
| 2022/0171886 A1* | 6/2022 | Schiffman | G06F 21/73 |
| 2022/0294637 A1* | 9/2022 | Liu | H04L 9/3236 |
| 2022/0407714 A1* | 12/2022 | Grobelny | H04L 9/0897 |
| 2023/0179425 A1* | 6/2023 | Brown | H04L 63/1441 |
| | | | 713/168 |

OTHER PUBLICATIONS

Dell Technologies, "Dell Technologies Supply Chain Security: Secured Component Verification for PowerEdge", 2020, 3 pgs.
Dell Technologies, "Dell EMC Secured Component Verification Reference Guide for Servers", 2020, 14 pgs.

* cited by examiner

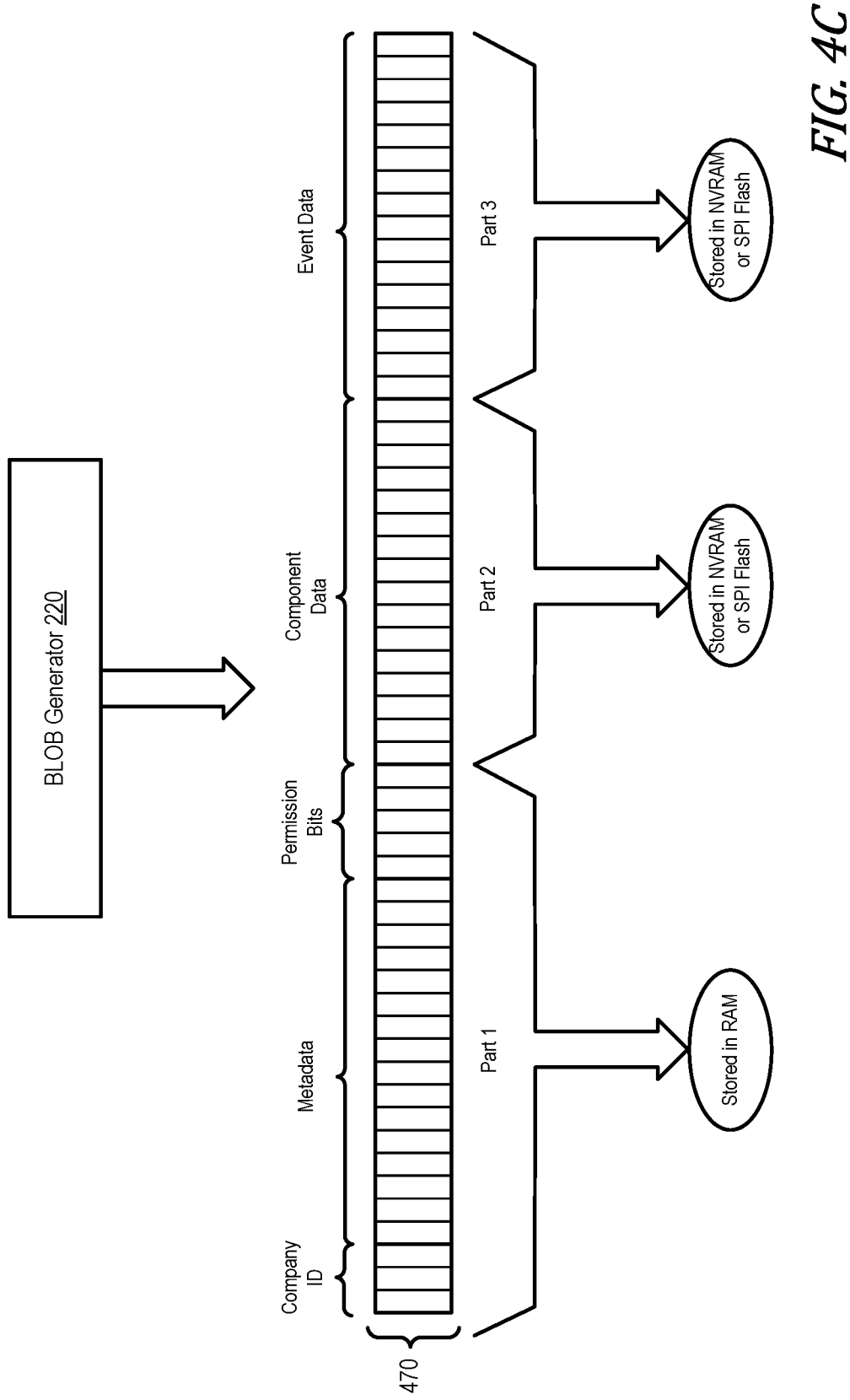

INFORMATION HANDLING SYSTEMS AND RELATED METHODS TO CRYPTOGRAPHICALLY VERIFY INFORMATION HANDLING SYSTEM PLATFORM COMPONENTS AND TRACK EVENTS ASSOCIATED WITH THE PLATFORM COMPONENTS

FIELD

This invention relates generally to information handling systems, and more particularly, to information handling systems and related methods to verify the hardware and software components included within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As known in the art, an information handling system (IHS) may take a variety of forms (e.g., a desktop computer, laptop computer, tablet computer, server, smart phone, smart device, Internet of things (IoT) device, etc.), and thus, may include a wide variety of hardware components. Examples of hardware components included within an IHS include, but are not limited to, one or more processing devices (e.g., a CPU, GPU, embedded controller, microcontroller, etc.), computer readable memory (e.g., RAM, ROM, SPI Flash, etc.), computer readable storage devices (e.g., HDD, SSD, etc.), a platform controller hub (PCH), a trusted platform module (TPM), additional hardware components (e.g., a video card, sound card, USB hub with USB controller, etc.), input/output devices (e.g., keyboards, keypads, touch screens, cameras, mice, etc.), and buses operable to transmit communications between the various hardware components, input/output devices, etc. An IHS may also include a wide variety of software components, including an operating system (OS), a boot system and various application programs.

A system platform contains the hardware and software components on which the application programs are run. For example, a system platform may generally include an operating system (e.g., Microsoft Windows), a boot system (e.g., a Basic Input Output System (BIOS) and/or Unified Extensible Firmware Interface (UEFI)) and underlying hardware, such as the processing devices, computer readable memory, computer readable storage devices, PCH, TPM, additional hardware components, input/output devices, and buses mentioned above. During the manufacturing phase, an IHS configured with a particular set of hardware and software components may be assigned a unique identifier (such as, e.g., a service tag, serial number, product ID, or Extensible Provisioning Protocol ID, "ePPID"), which may be used to uniquely identify the IHS. The unique identifier may be provided on a chassis of the IHS (e.g., on a tag, sticker or other label), or may be stored securely on the system platform.

In some cases, an IHS may be modified after it leaves the primary manufacturing facility. System reconfiguration activities can occur at various stages after manufacturing is complete. For example, a second manufacturing facility may add or remove hardware or software components to/from the IHS before the IHS is delivered to an end user. After the end user receives the IHS, system reconfiguration may also occur when malfunctioning components are replaced in the field, when non-failing system returns are rebuilt and returned as refurbished systems, and when system administrators and/or end users make modifications to their systems during normal use.

In some cases, it may be desirable to verify that the hardware and software components provided on the system platform of an IHS are correct and trustworthy after the IHS leaves the primary manufacturing facility. One conventional method for identifying system configuration includes using the unique identifier assigned to the IHS to determine the platform line of business (LOB), which may be used to obtain a limited amount of static information about the IHS (such as, e.g., the host processor, memory or storage device included within the IHS). Alternatively, a platform memory dump may be performed to obtain dynamic information about the IHS (such as, e.g., sensor values from sensor hubs, performance statistics like current CPU load, storage occupancy, etc., diagnostic reports from various devices or components, etc.). Unfortunately, the conventional methods mentioned above are not cost effective, impossible to do at a customer site and/or may not provide all system platform information and/or failure event data needed to securely verify the hardware and software components provided on the system platform.

Another conventional method for verifying system configuration is described in the commonly owned U.S. patent application Ser. No. 16/800,751 filed on Feb. 25, 2020, entitled "SYSTEMS AND METHODS TO CRYPTOGRAPHICALLY VERIFY INFORMATION HANDLING SYSTEM CONFIGURATION" and incorporated herein in its entirety. The above-mentioned patent application describes various embodiments of systems and methods to track an original system configuration of an IHS as the system was built by a manufacturing facility, and any system configuration changes that are made to the original system configuration after the IHS leaves the manufacturing facility (including changes made to the hardware/software components provided on the system platform). Once a user takes ownership of the IHS, the systems and methods disclosed in the above-mentioned patent application may be used to cryptographically verify a current system configuration of the IHS.

The embodiments disclosed in the above-mentioned patent application use digital certificates to track the original system configuration and any changes made thereto. Although an effective method for tracking system configuration changes after an IHS leaves the manufacturing facility, some information handling systems cannot bear the burden of digital certificate creation due to cost and storage issues.

SUMMARY OF THE INVENTION

The following description of various embodiments of information handling systems and related methods is not to be construed in any way as limiting the subject matter of the appended claims.

As noted above, conventional information handling systems and methods used to verify system configuration fail to provide a cost effective method to obtain all system platform information and/or event data needed to securely verify the hardware and software components provided on the system platform. To overcome the problems associated with conventional system and methods, the present disclosure provides various embodiments of information handling systems and related methods to generate a cryptographic key, which may be used to cryptographically verify the hardware and software components provided on the system platform and track events associated with the system platform components.

As described in more detail below, the information handling systems and methods disclosed herein may be used to collect and embed platform-related information into a single cryptographic key. A wide variety of platform-related information may be collected from a plurality of hardware and software components provided on the system platform (otherwise referred to as "system platform components" or "platform components"). Once a cryptographic key is generated, it may be decoded and/or compared with cryptographic key(s) subsequently generated by the IHS to securely verify the system platform components, determine if changes have been made to the system platform components, facilitate system diagnostics and/or perform additional functions.

By embedding platform-related information into a cryptographic key, the information handling systems and methods disclosed herein provide a cost effective, one stop solution to perform secure verification of the system platform components and perform other functions. Unlike conventional methods, which use digital certificates to track system platform configuration, the information handling systems and methods disclosed herein reduce operating costs by using boot services, which are locally stored and executed on the information handling system, to generate a cryptographic key containing platform-related information.

According to one embodiment, an information handling system (IHS) in accordance with the present disclosure may include a plurality of boot services, which are stored within a computer readable memory of the IHS and executed by a processing device of the IHS to perform the techniques described herein. In some embodiments, for example, the IHS disclosed herein may include a first boot service, a second boot service and a third boot service.

The first boot service may be executed by the processing device to collect platform-related information from a plurality of system platform components included within the IHS. In some embodiments, the platform-related information may include component data and event data corresponding to the system platform components. For each system platform component, the first boot service may be executed by the processing device to generate a metadata node, a component node and an event node containing the platform-related information collected from the system platform component. The component nodes may include the component data collected from the system platform components, the event nodes may include the event data collected from the system platform components, and the metadata nodes may include metadata specifying where the component data within the component nodes and the event data within the event nodes are stored. In some embodiments, the metadata contained within metadata nodes may be stored in a secure location on a system platform of the IHS, and the platform-related information contained within the component nodes and the event nodes may be encrypted, stored within different non-volatile memory namespaces and accessed only through the metadata nodes.

The second boot firmware may be executed by the processing device to generate a binary large object (BLOB) that includes at least a subset of the platform-related information contained within the metadata nodes, the component nodes and/or the event nodes. In some embodiments, the second boot service may generate the BLOB based on: user permissions of a requestor requesting access to the platform-related information contained within one or more of the component nodes and the event nodes, and permission bits assigned to the one or more of the component nodes and the event nodes.

The third boot service may be executed by the processing device to encode the BLOB to create a cryptographic key containing the platform-related information included within the BLOB. In some embodiments, the third boot service may encode the BLOB to create a cryptographic key by: dividing the BLOB into multiple parts including a first part containing the metadata, a second part containing the component data and a third part containing the event data; dividing each of the multiple parts into multiple sub-parts; applying a hash algorithm to each of the multiple sub-parts to generate a set of hash strings; combining two or more hash strings in the set of hash strings and applying a hash algorithm to the combined hash strings to generate another set of hash strings; repeating the step of combining two or more hash strings and applying a hash algorithm to the combined hash strings until a final hash string is generated; and encrypting the final hash string to create the cryptographic key.

In some embodiments, the first boot service may be further executed by the processing device to assign permission bits to the component nodes and the event nodes. The permission bits may specify user permissions for accessing the platform-related information contained within the component nodes and the event nodes.

In some embodiments, the IHS may include a fourth boot service, which may be stored within the computer readable memory of the IHS and executed by the processing device of the IHS to: receive a request from a requestor to access platform-related information stored within one or more of the component nodes and the event nodes; verify the user permissions of the requestor with the permission bits assigned to the one or more of the component nodes and the event nodes; and fetch the platform-related information stored within the one or more of the component nodes and the event nodes if the user permissions are verified.

In some embodiments, the second boot service may be further executed by the processing device to generate the BLOB based on: the request received from the requestor, the user permissions of the requestor, and the permission bits assigned to the one or more of the component nodes and the event nodes.

In some embodiments, the first boot service, the second boot service and the third boot service may be executed by the processing device every time the IHS is rebooted to create a new cryptographic key. In some embodiments, the new cryptographic key may be compared with the cryptographic key to verify the system platform components and/or track changes made to the system platform components. In other embodiments, the new cryptographic key may be compared with the cryptographic key to track events associated with the system platform components.

According to another embodiment, a computer implemented method is provided herein to generate a cryptographic key, which may be used to cryptographically verify information handling system platform components and track events associated with the platform components. The computer implemented method described herein may be performed by a processing device of an information handling system (IHS) executing program instructions contained within boot services stored within a computer readable memory of the IHS. In one example, the computer implemented method described herein may be performed by an embedded controller of the IHS executing program instructions contained within one or more boot services.

In some embodiments, the computer implemented method described herein may include collecting platform-related information from a plurality of system platform components included within the IHS. In some embodiments, the platform-related information may include component data and event data corresponding to the system platform components. In other embodiments, additional platform-related information may be collected from the plurality of system platform components.

For each system platform component, the computer implemented method may further include generating a metadata node, a component node and an event node containing the platform-related information collected from the system platform component. The component nodes may include the component data collected from the system platform components, the event nodes may include the event data collected from the system platform components, and the metadata nodes may include metadata specifying where the component data within the component nodes and the event data within the event nodes are stored.

The computer implemented method may further include generating a binary large object (BLOB) that includes at least a subset of the platform-related information contained within the metadata nodes, the component nodes and/or the event nodes. In some embodiments, the generated BLOB may be based on: user permissions of a requestor requesting access to the platform-related information contained within one or more of the component nodes and the event nodes; and permission bits assigned to the one or more of the component nodes and the event nodes.

The computer implemented method may further include encoding the BLOB to create a cryptographic key containing the platform-related information included within the BLOB. In some embodiments, the BLOB may be encoded and the cryptographic key may be created by: dividing the BLOB into multiple parts including a first part containing the metadata, a second part containing the component data and a third part containing the event data; dividing each of the multiple parts into multiple sub-parts; applying a hash algorithm to each of the multiple sub-parts to generate a set of hash strings; combining two or more hash strings in the set of hash strings and applying a hash algorithm to the combined hash strings to generate another set of hash strings; repeating the step of combining two or more hash strings and applying a hash algorithm to the combined hash strings until a final hash string is generated; and encrypting the final hash string to create the cryptographic key.

The computer implemented method disclosed herein is not strictly limited to the method steps described above may include additional and/or alternative method steps. In some embodiments, for example, the computer implemented method may further include: storing the metadata contained within metadata nodes in a secure location on a system platform of the IHS; encrypting the platform-related information contained within the component nodes and the event nodes; storing the encrypted platform-related information within different non-volatile memory namespaces; and accessing the encrypted platform-related information stored within different non-volatile memory namespaces only through the metadata nodes.

In some embodiments, the computer implemented method may further include assigning permission bits to the component nodes and the event nodes, wherein the permission bits specify user permissions for accessing the platform-related information contained within the component nodes and the event nodes.

In some embodiments, the computer implemented method may further include receiving a request from a requestor to access platform-related information stored within one or more of the component nodes and the event nodes; verifying the user permissions of the requestor with the permission bits assigned to the one or more of the component nodes and the event nodes; and fetching the platform-related information stored within the one or more of the component nodes and the event nodes if the user permissions are verified. In such embodiments, the generated BLOB may be based on: the request received from the requestor, the user permissions of the requestor and the permission bits assigned to the one or more of the component nodes and the event nodes.

In some embodiments, the computer implemented method may further include repeating the steps of collecting platform-related information, generating a metadata node, a component node and an event node, generating a BLOB and encoding the BLOB each time the IHS is rebooted to create a new cryptographic key. In some embodiments, the computer implemented method may further include comparing the new cryptographic key with the cryptographic key to verify the system platform components and/or track changes made to the system platform components. In other embodiments, the computer implemented method may further include comparing the new cryptographic key with the cryptographic key to track events associated with the system platform components.

BRIEF DESCRIPTION OF THE DRAWINGS

Other advantages of the present disclosure will become apparent upon reading the following detailed description and upon reference to the accompanying drawings in which:

FIG. 4C is a block diagram illustrating one embodiment of a BLOB created by the BLOB generator;

Figure 1:
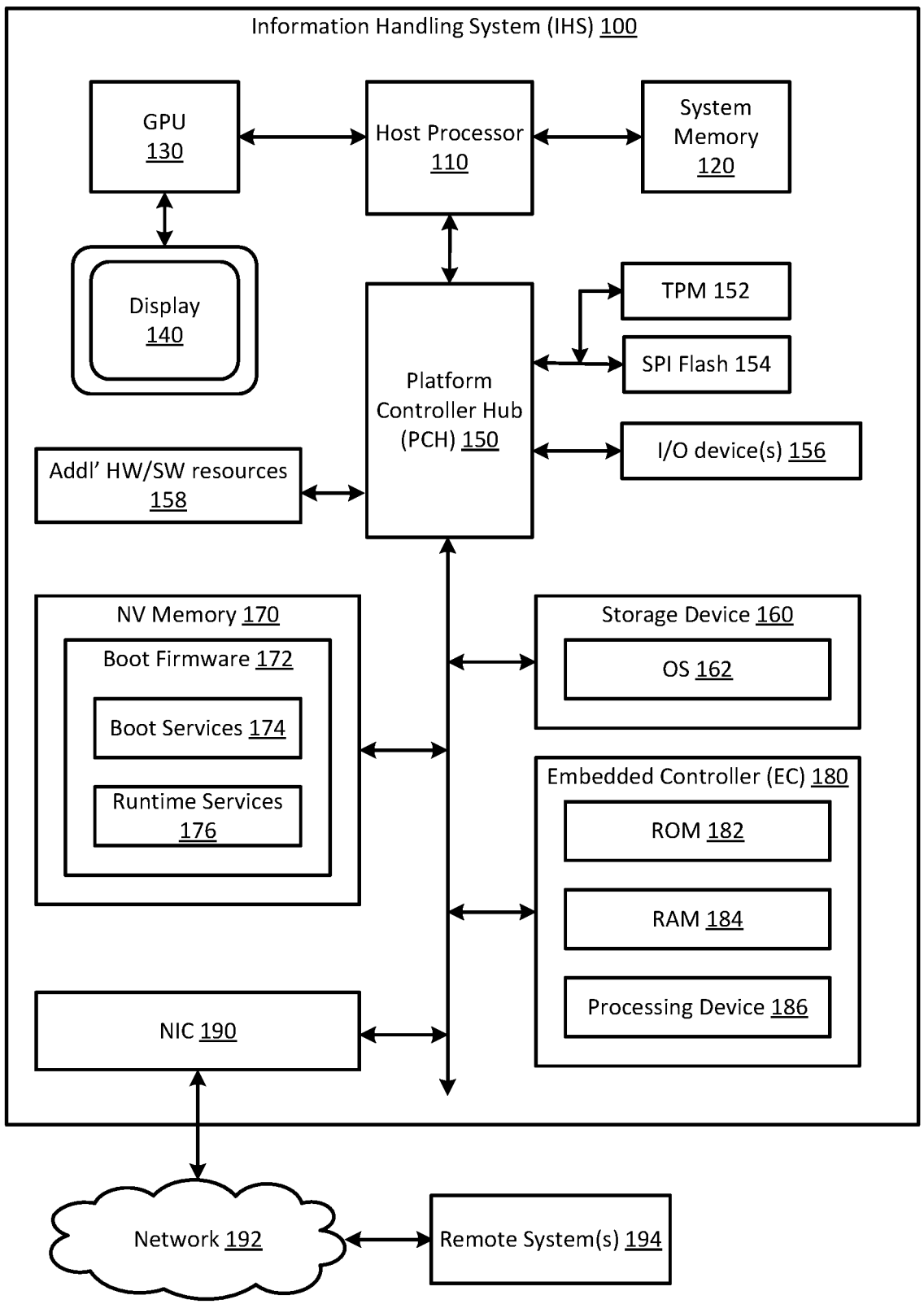
FIG. 1 is a block diagram illustrating one embodiment of an information handling system (IHS) in accordance with the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

The present disclosure provides various embodiments of information handling systems and related methods to generate a cryptographic key, which may be used to cryptographically verify information handling system (IHS) platform components and track events associated with the platform components. FIG. 1 illustrates one embodiment of an information handling system 100 (e.g., a desktop computer, laptop computer, tablet computer, a smart phone, a smart device, an Internet of Things (IoT) device, etc.) in accordance with the present disclosure.

It is expressly noted that the IHS configuration shown in FIG. 1 is exemplary only, and that the methods disclosed herein to generate a cryptographic key, which may be used to cryptographically verify information handling system platform components and track events associated with the platform components may be implemented on any type and/or configuration of IHS. It will be further understood that while certain components of an information handling system are shown in FIG. 1 for illustrating embodiments of the present disclosure, the information handling system disclosed herein is not restricted to including only those components shown in FIG. 1 and described below.

IHS 100 may generally include a plurality of hardware and software components. Examples of hardware components that may be included within IHS 100 include, but are not limited to, host processor 110, system memory 120, graphics processor unit (GPU) 130, display device 140, and platform controller hub (PCH) 150. IHS 100 may also include a variety of hardware components, which are communicatively coupled to the PCH 150, such as but not limited to, Trusted Platform Module (TPM) 152, SPI Flash memory 154, input/output (I/O) devices 156, additional hardware/software resources 158, computer readable storage device 160, computer readable non-volatile (NV) memory 170, an embedded controller (EC) 180, and network interface controller (NIC) 190. Other hardware components not explicitly shown and described herein may also be included within IHS 100, as is known in the art. Host processor 110, system memory 120, GPU 130, PCH 150, TPM 152, SPI Flash memory 154, I/O devices 156, additional hardware/software resources 158, computer readable storage device 160, computer readable NV memory 170, EC 180, and NIC 190 are examples of hardware components that may be provided on the system platform.

Host processor 110 may be generally configured to execute program instructions (computer program code) to perform a variety of different functions for the IHS. The host processor 110 may be implemented using a wide variety of programmable integrated circuits (e.g., a processor, such as a controller, microcontroller, microprocessor, ASIC, etc.) and/or programmable logic devices (e.g., a field programmable gate array "FPGA", complex programmable logic device "CPLD", etc.). According to one embodiment, host processor 110 may comprise at least one central processing unit (CPU) having one or more processing cores.

System memory 120 is coupled to host processor 110 and configured to store program instructions (or computer program code), which are executable by the host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS 100. In the illustrated embodiment, GPU 130 is coupled to display device 140 (e.g., a display screen or monitor) to provide visual images to the user. In some embodiments, GPU 130 may also be coupled to one or more display ports to support additional display functions. Although shown in FIG. 1 as a separate integrated chip coupled to host processor 110 via a bus, GPU 130 may alternatively be integrated with the host processor as a silicon-on-chip (SoC) processor.

In some embodiments, IHS 100 may include additional processing devices such as, but not limited to, a graphicsderivative processor (such as a physics/gaming processor), a vision processing unit (VPU), a Gaussian Neural Accelerator (GNA) coprocessor, a digital signal processor (DSP), a security processor, and/or a trusted execution environment (such as Intel SGX, Intel TXT, a Global Platform TEE, Intel TXE, Intel CSME, AMD PSP, etc.). When included, the additional processing devices may provide additional compute and/or intelligence functionality to the system platform.

Platform controller hub (PCH) 150 is coupled to the host processor 110 and configured to handle I/O operations for the IHS 100. PCH 150 may include a variety of communication interfaces and ports for communicating with various IHS components, such as TPM 152, Flash memory 154 (e.g., an SPI Flash), I/O devices 156, additional hardware/software resources 158, NV memory 160, EC 170, storage device 180, and NIC 190. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit (I$^2$C) interface, a Universal Serial Bus (USB) interface and a Thunderbolt™ interface.

In some embodiments, a Trusted Platform Module (TPM) 152 may be included within the IHS 100 to ensure platform integrity, provide secure storage of sensitive information, and perform remote attestation and other cryptographic functions. As known in the art, a TPM can be used to establish a strong root of trust for the IHS 100 by ensuring that the boot process starts from a trusted combination of hardware and software, and continues until the operating system has fully booted and applications are running. In addition to ensuring platform integrity, a TPM generates and uses cryptographic keys to verify or attest to the authenticity of various hardware and/or software components, and to bind and seal data/keys/applications to the platform.

The TPM 152 shown in FIG. 1 may generally include a microcontroller (or crypto-processor) to generate keys and perform cryptographic functions, persistent memory for storing small amounts of sensitive information (such as cryptographic keys) in a secure location, and versatile memory for storing platform metrics and additional keys. The TPM crypto-processor may generally include a hash generator and encryption-decryption engine to hash large blocks of data, and a key generation engine and random number generator to generate keys that can be used for attestation purposes. In some embodiments, the TPM 152 may be used to generate a cryptographic key containing a wide variety of platform-related information, which may be collected from hardware and software components included within the IHS 100. In other embodiments, another processing device (e.g., processing device 186 and/or host processor 110) may be used to generate the cryptographic key.

I/O device(s) 156 enable the user to interact with IHS 100 and the software/firmware executing thereon. In some embodiments, one or more I/O devices 156 may be provided within IHS 100. In other embodiments, I/O device(s) 156 may be separate from the IHS and may interact with the IHS through a wired or wireless connection. Examples of I/O devices 156 include, but are not limited to, keyboards, keypads, touch screens, cameras, mice, scanning devices, voice or optical recognition devices, biometric devices, and any other devices suitable for entering or retrieving data or receiving user input.

Additional hardware/software resources 158 may be coupled to one or more of the communication interfaces and ports contained within PCH 130 to provide additional functionality to the IHS 100. Examples of additional hardware/software resources 158 include, but are not limited to, a video card, sound card, small system computer interface (SCSI) controller, hardware RAID controller, serial/parallel port card, IEEE 1394 cards, Thunderbolt™ card, a USB hub with USB controller hardware or software driver, network inbox driver, camera driver/camera input privacy, audio I/O devices (e.g., speaker privacy, keyboard shortcuts, etc.), SATA/eSATA controller card, PS/2 controller card, non-volatile memory card, PCH storage, CPU storage, etc.

Computer readable storage device 160 may include any type of persistent, non-transitory computer readable storage device, such as one or more hard disk drives (HDDs) or solid-state drives (SSDs), and may be configured to store software components and/or data. For example, computer readable storage device 160 may store an operating system (OS) 162 for the IHS 100, in addition to other software components and/or data (not shown). The software components stored within the computer readable storage device 160 may be executed by host processor 110 to perform various operations for the system and/or the user.

Computer readable NV memory 170 may include any suitable type of non-volatile memory and/or Flash memory device, and may be configured to store boot firmware (FW) 172 and other system firmware (not shown). Boot firmware 172 may include software and/or firmware modules for specifying hardware configuration settings, system date/time, boot sequence, etc., and may be implemented as a Basic Input/Output System (BIOS) and/or a Unified Extensible Firmware Interface (UEFI).

As known in the art, boot firmware 172 may include boot services 174 and runtime services 176. Boot services 174 are available for execution when the boot firmware 172 owns the system platform during a pre-boot phase before the OS 162 is loaded and running. Runtime services 176, on the other hand, are available for execution while the OS 162 is running (i.e., during OS runtime). As described in more detail below, one or more of the boot services 174 stored within computer readable NV memory 170 may be executed by a processing device of the IHS 100 (e.g., the processing device 186 within EC 180 and/or host processor 110) to generate a cryptographic key, which may be used to cryptographically verify information handling system platform components and track events associated with the platform components in accordance with the techniques described herein.

Embedded controller (EC) 180 may be configured to boot the information handling system and perform other functions. As shown in FIG. 1, EC 180 includes read only memory (ROM) 182, random access memory (RAM) 184 and a processing device 186 (e.g., a controller, microcontroller, microprocessor, ASIC, etc.) for executing program instructions, which may be stored within its internal memory and/or fetched from NV memory 170. For example, the processing device 186 within EC 180 may be configured to execute program instructions (e.g., a boot block) stored within its internal ROM 182 to initiate a boot process for the IHS 100. Each time the IHS 100 is powered on or rebooted, an IHS processing device (e.g., processing device 186 and/or host processor 110) may execute boot firmware 172 to test and initialize IHS hardware components, perform a Power-On Self-Test (POST) to ensure the hardware configuration is valid and working properly, load the OS 162 from the computer readable storage device 160, and/or perform a variety of other actions known in the art.

Figure 2:
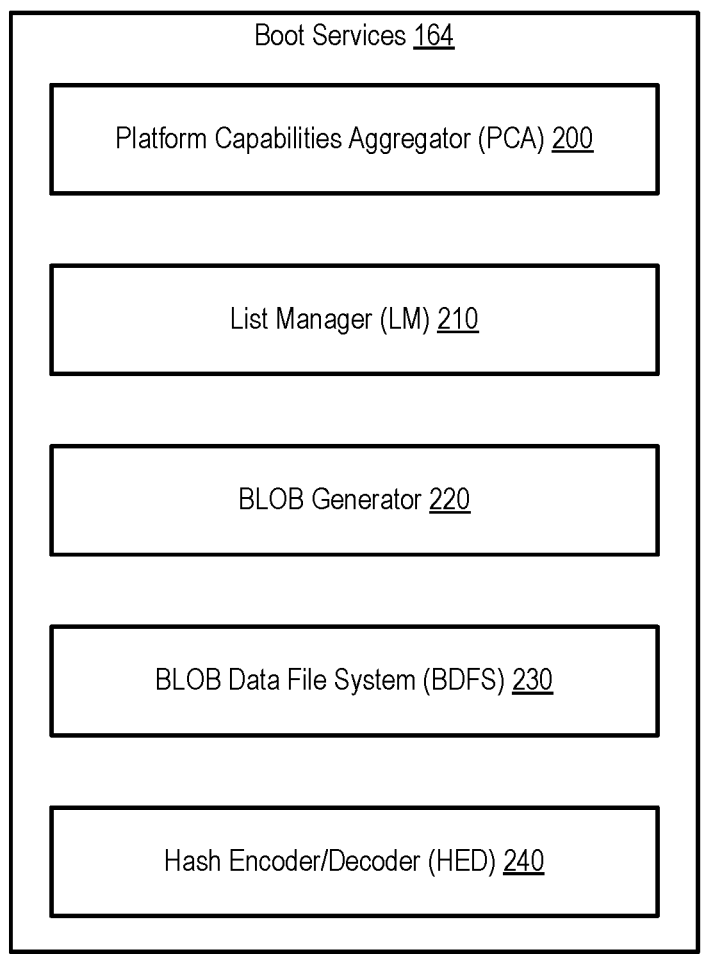
FIG. 2 is a block diagram illustrating example boot services, which may be executed by a processing device of the IHS shown in FIG. 1 to perform the various techniques disclosed herein, wherein the boot services include a Platform Capabilities Aggregator (PCA), a List Manager (LM), a BLOB generator, a BLOB Data File System (BDFS) and a Hash Encoder/Decoder (HED)

In some embodiments, the processing device 186 within EC 180 may execute one or more boot services 174 during the pre-boot phase (e.g., after POST and before the OS 162 is loaded and running) to generate a cryptographic key, which may be used to cryptographically verify information handling system platform components and track events associated with the platform components. Examples of boot services 174 executed by processing device 186 during the pre-boot phase are shown in FIG. 2 and described in more detail below.

NIC 190 enables IHS 100 to communicate with one or more remote systems 194 via a network 192. For purposes of this discussion, network 192 is indicated as a single collective component for simplicity. However, it is appreciated that network 192 may comprise one or more direct connections to other remote systems, as well as a more complex set of interconnections as can exist within a wide area network, such as the Internet. For example, network 192 may be a local area network (LAN), wide area network (WAN), personal area network (PAN), or the like, and the connection to and/or between IHS 100 and network 192 may be wired, wireless or a combination thereof. In some embodiments, IHS 100 may utilize NIC 190 and network 192 to provide a cryptographic key to a remote system 194 or service, such as but not limited to, a cloud service, a remote support service, an IT department or administrator system, a mobile device (e.g., the user's smart phone), etc. As described in more detail below, the cryptographic key may be transmitted to a remote system 194 or service to facilitate system diagnostics.

As noted above, conventional systems and methods used to verify system configuration fail to provide a cost effective method to obtain all system platform information and/or event data needed to securely verify the hardware and software components provided on an information handling system platform. Conventional methods also fail to provide a secure method for obtaining system platform information and event data based on the user permissions of a requestor requesting access to such information. To overcome the problems associated with conventional methods, the present disclosure provides various embodiments of information handling systems and related methods to generate a cryptographic key, which may be used to cryptographically verify the hardware and software components provided on the system platform and track events associated with the system platform components. The cryptographic key generated by the embodiments of information handling systems and methods disclosed herein may contain a wide variety of platform-related information and/or event data. In at least some of the disclosed embodiments, the platform-related information and/or event data included within the cryptographic key may be based, at least in part, on a request received from a user and the user permissions of the user.

As described in more detail below, the information handling systems and methods disclosed herein may be used to collect and embed platform-related information into a single cryptographic key. A wide variety of platform-related information may be collected from a plurality of hardware and software components provided on the system platform (otherwise referred to as "system platform components" or "platform components"). Examples of platform-related information that may be collected from the system platform components and embedded within a cryptographic key include, but are not limited to, information identifying the IHS (such as, e.g., company name, system type, system category, warranty ID, manufacturing date, end of life (EOL) date, LOB details, etc.), information identifying the hardware and software components provided on the system platform (such as, e.g., software/firmware versions, component identifiers, vendor identifiers, etc.), information corresponding to the hardware/software components (such as, e.g., component data, failure events, change events, status, etc.) and more. Once a cryptographic key is generated, it may be decoded and/or compared with cryptographic key(s) subsequently generated by the IHS to securely verify the system platform components, determine if changes have been made to the system platform components, facilitate system diagnostics and/or perform additional functions.

In some embodiments, an information handling system (IHS) in accordance with the present disclosure may generate a cryptographic key to track an original system configuration of the IHS as the system was built by a manufacturing facility. During the manufacturing phase, firmware components stored within the IHS may be executed by a processing device of the IHS to collect platform-related information identifying the IHS and the hardware/software components provided on the system platform, and embed the collected information within a single cryptographic key. After the IHS leaves the manufacturing facility, the firmware components may again be executed (e.g., each time the IHS is rebooted) to recollect platform-related information and generate a new cryptographic key. The platform-related information collected after the IHS leaves the manufacturing facility may include information identifying the IHS, information identifying the hardware/software components provided on the system platform, and component data and event data (e.g., failure events, change events, status, etc.) corresponding to the hardware/software components provided on the system platform.

The IHS 100 shown in FIGS. 1-4D represents one embodiment of an information handling system that utilizes the techniques described herein to generate a cryptographic key, which may be used to cryptographically verify information handling system platform components and track events associated with the platform components. By embedding platform-related information into a cryptographic key, the IHS 100 shown in FIGS. 1-4D and described herein provides a cost effective, one stop solution to securely identify and verify the hardware and software components provided on the system platform. In some respects, the techniques described herein improve the way IHS 100 functions by providing a single, trusted identifier, which can be used to verify system platform configuration to a requestor (e.g., an end user, administrator, service center representative, system platform component, software/firmware component, etc.), determine if changes have been made to the platform components, facilitate system diagnostics, establish device authenticity and provenance, bind and entitle services and software to the IHS, etc.

The techniques described herein may generally be implemented in firmware, or computer program instructions, which are locally stored and executed within an information handling system, such as but not limited to, the IHS 100 shown in FIGS. 1-4D. In some embodiments, the techniques described herein may be implemented as boot firmware services (e.g., BIOS and/or UEFI services). FIG. 2 illustrates one embodiment of boot firmware services that may utilize the techniques described herein to generate a cryptographic key. It will be understood that, while certain firmware components of the IHS 100 are shown in FIG. 2 for illustrating embodiments of the present disclosure, the information handling system disclosed herein is not restricted to including only those components shown in FIG. 2 and described below.

FIG. 2 illustrates a variety of boot services 174 that may be stored within computer readable NV memory 170 and executed by EC 180 during the pre-boot phase (e.g., after POST and before the OS 162 is loaded and running) to generate a cryptographic key, which may be used to cryptographically verify information handling system platform components and track events associated with the platform components. The boot services 174 shown in FIG. 2 include a Platform Capabilities Aggregator (PCA) 200, a List Manager (LM) 210, a BLOB generator 220, a BLOB Data File System (BDFS) 230 and a Hash Encoder/Decoder (HED) 240.

PCA 200 may be executed to collect platform-related information from the IHS 100. More specifically, PCA 200 may be executed to collect platform-related information from a plurality of hardware and software components (e.g., host processor 110, system memory 120, GPU 130, TPM 152, computer readable storage device 160, OS 162, boot firmware 172, EC 180 and NIC 190) provided on a system platform of the IHS 100. A wide variety of platform-related information may be collected from the system platform components at the time of manufacturing and in the field when the IHS 100 is powered on or rebooted. Examples of platform-related information that may be collected by PCA 200 include, but are not limited to, information identifying the IHS, information identifying the system platform components, information corresponding to the system platform components and other platform-related information.

Figure 3:
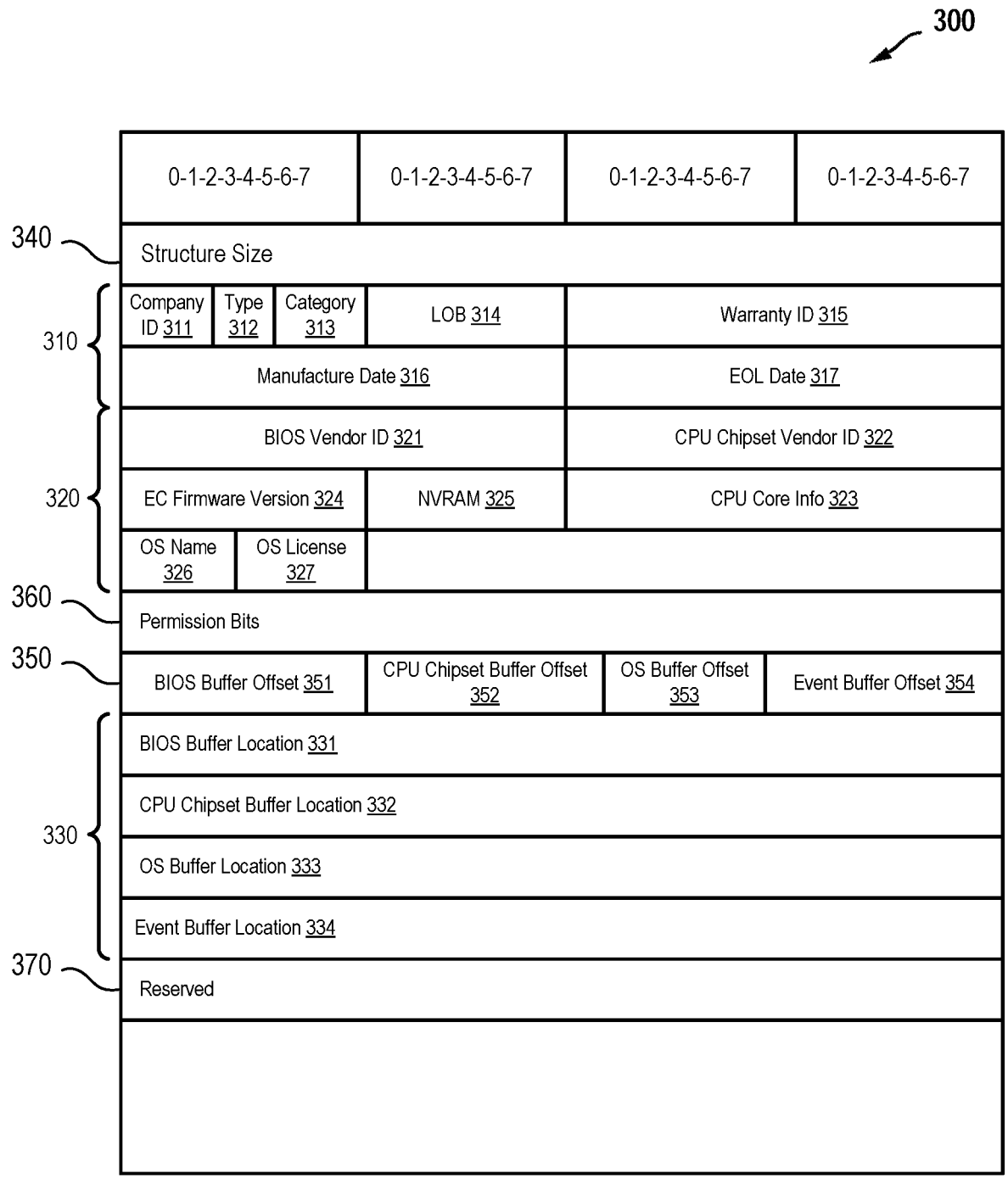
FIG. 3 is a block diagram illustrating a data structure containing various examples of platform-related information, which may be collected by the PCA.

FIG. 3 illustrates an example embodiment of a data structure 300 containing various examples of platform-related information that may be collected by PCA 200. In the example embodiment shown in FIG. 3, data structure 300 includes information 310 identifying the IHS, information 320 identifying the system platform components, and information corresponding to the system platform components, such as details and events associated with the system platform components. In addition to the above-mentioned information, data structure 300 may also include a structure size 340 (specifying a size of the data structure 300), buffer offset values 350 (specifying a buffer offset value from the start of the data structure 300), permission bits 360 and reserved fields 370 (optional).

PCA 200 may collect a wide variety of information 310 identifying the IHS 100. In the example embodiment shown in FIG. 3, information 310 includes a company ID 311, system type 312, system category 313, LOB details 314, warranty ID 315, manufacturing date 316, and end of life (EOL) date 317. It is recognized that PCA 200 is not restricted to collecting only the information 310 shown in FIG. 3. In some embodiments, PCA 200 may collect additional or alternative information 310 identifying the IHS 100.

The company ID 311 identifies the original manufacturer of the IHS 100. In one embodiment, the company ID 311 may be a 4-bit numerical value provided by a central authority to identify the original manufacturer (e.g., 1010 for Dell, 0102 for HP, etc.). The remaining information 310 (e.g., the system type 312, system category 313, LOB details 314, warranty ID 315, manufacturing date 316, and end of life (EOL) date 317) may be provided by the original manufacturer to further identify the IHS. For example, the system type 312 may be provided by the original manufacturer to identify the type of information handling system (e.g., desktop (D), notebook (N), etc.), while the system category 313 is provided to specify the category or business division for which the IHS was built (e.g., whether the IHS is configured for consumer (C), enterprise (E) or gaming (G)). The platform LOB details 314 provides static information about the IHS (such as, e.g., the host processor, memory and/or storage device included within the IHS). The warranty ID 315 provides an identifier for a warranty associated with the IHS. The manufacturing date 316 specifies the date (and optionally, the time) the IHS was built by the original manufacturer, and the EOL date 317 specifies the date at which service for the IHS expires.

PCA 200 may also collect a wide variety of information 320 identifying the hardware and software components provided on the system platform. In the example embodiment shown in FIG. 3, information 320 includes a BIOS vendor ID 321, CPU chipset vendor ID 322, CPU core information 323, EC firmware version 324, NVRAM information 325, OS name 326 and OS license 327. It is recognized that PCA 200 is not restricted to collecting only the information 320 shown in FIG. 3. In some embodiments, PCA 200 may collect additional or alternative information 320 identifying the hardware and software components provided on the system platform.

The BIOS vendor ID 321 identifies the vendor (e.g., Dell, HP, AMI, etc.) of the boot firmware 172. The CPU chipset vendor ID 322 identifies the vendor (e.g., Intel, AMD, Qualcomm, etc.) of the chipset containing the host processor 110, while the CPU core information 322 provides information about the host processor (e.g., number of processing cores, etc.). EC firmware version 324 specifies the version of the EC firmware stored, for example, within EC RAM 184. NVRAM information 325 specifies where the boot firmware and additional EC firmware are stored within the NVRAM. Finally, the OS name 326 and OS license 327 specify the name of the operating system 162 (e.g., Microsoft Windows) and the license key corresponding thereto.

In addition to the identifying information 310 and 320, PCA 200 may collect information corresponding to the system platform components such as, for example, component data (e.g., a component ID and component specifications) and event data (e.g., failure events, change events, etc.). The information collected from each system platform component may be stored within a buffer. For example, PCA 200 may store component data collected from a system platform component within a component buffer and event data collected from the system platform component within an event buffer. In some embodiments, the component buffers and event buffers may be stored within different non-volatile memory (e.g., NVRAM or SPI Flash) namespaces. In order to locate the information stored within the buffers, data structure 300 may include a buffer location 330 and a buffer offset 350 for each component buffer and event buffer.

PCA 200 may collect a wide variety of information corresponding to the system platform components. In the example embodiment shown in FIG. 3, data structure 300 includes a BIOS buffer location 331 and BIOS buffer offset 351, which specify a buffer location and offset for a BIOS buffer containing BIOS details; a CPU chipset buffer location 332 and CPU chipset buffer offset 352, which specify a buffer location and offset for a CPU chipset buffer containing CPU chipset details; and an OS buffer location 333 and OS buffer offset 353, which specify a buffer location and offset for an OS buffer containing OS details. Event data (e.g., failure events, change events, etc.) for each system platform component may also be stored within an event buffer. Similar to the component buffers, data structure 300 may include an event buffer location 334 and event buffer offset 354 for each event buffer. It is recognized that while certain examples are shown in FIG. 3, data structure 300 may include additional buffer locations 330 and buffer offsets 350 for additional component buffers and event buffers, which may be respectively used to store component data and event data for other system platform components (such as, e.g., a HDD/SSD, a RAM, a SPI Flash memory, a battery or power supply unit, etc.).

As shown in FIG. 3, permission bits 360 may also be stored within the data structure 300. Permission bits 360 specify user permissions for accessing the platform-related information contained within the data structure 300 and stored within the component buffers and event buffers. A wide variety of permission bits 360 may be used to specify user permissions for accessing the platform-related information. Examples of permission bits 360 include, but are not limited to: 'A' for full read/write access for all fields included within the data structure 300; 'B' for read only access for all fields included within the data structure 300; 'C' for read only access for a given component buffer; 'D' for read only access for a given event buffer; 'E' for read only access for a given component buffer and corresponding event buffer, etc. Other permission bits 360 may also be specified for accessing the platform-related information.

It is recognized that the data structure 300 shown in FIG. 3 represents only one example of platform-related information that may be collected by PCA 200. Other information not shown in FIG. 3 may be additionally or alternatively collected by PCA 200 to identify the IHS, identify the hardware and software components provided on the system platform and/or provide component data and/or event data corresponding to the system platform components.

Figure 4A:
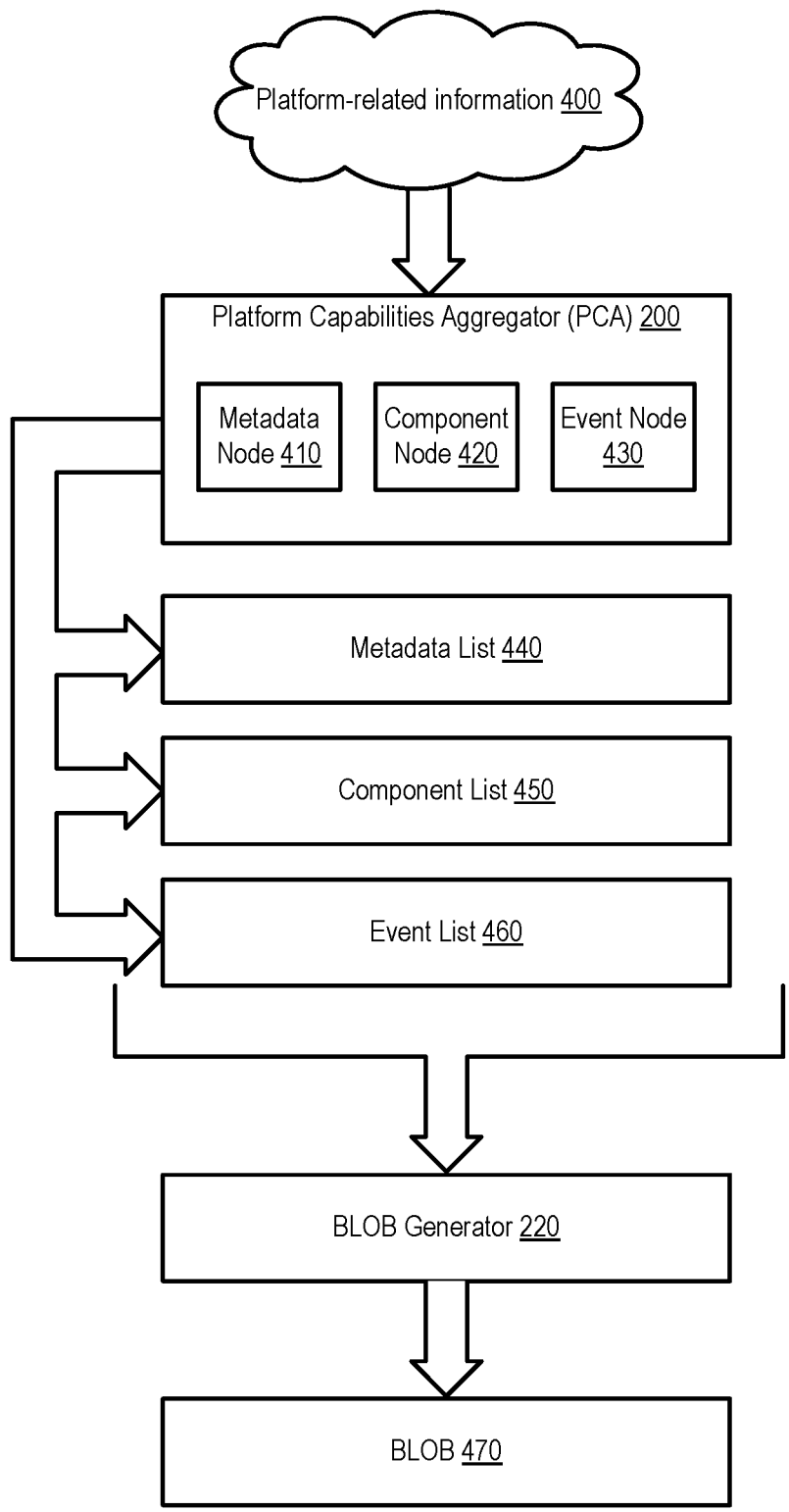
FIG. 4A is a functional block diagram illustrating how the PCA may use the platform-related information to create a plurality of linked lists, which may be provided to the BLOB generator to create a BLOB.

After platform-related information 400 is collected from the plurality of system platform components, PCA 200 may use the platform-related information 400 to generate a metadata node 410, a component node 420 and an event node 430, as shown in FIG. 4A. More specifically, PCA 200 may create a metadata node 410, a component node 420 and an event node 430 for each system platform component, store component data corresponding to the system platform component within a buffer provided within the component node 420, store event data corresponding to the system platform component within a buffer provided within the event node 430, and assign a permission bit to the component node 420 and the event node 430, which specifies user permissions for accessing the information contained therein. The metadata node 410 created for each system platform component contains metadata (e.g., a component buffer offset and an event buffer offset) specifying where the component data within the component node 420 and the event data within the event node 420 are stored. The metadata node 410 created for each system platform component may also contain other metadata.

Figure 4B:
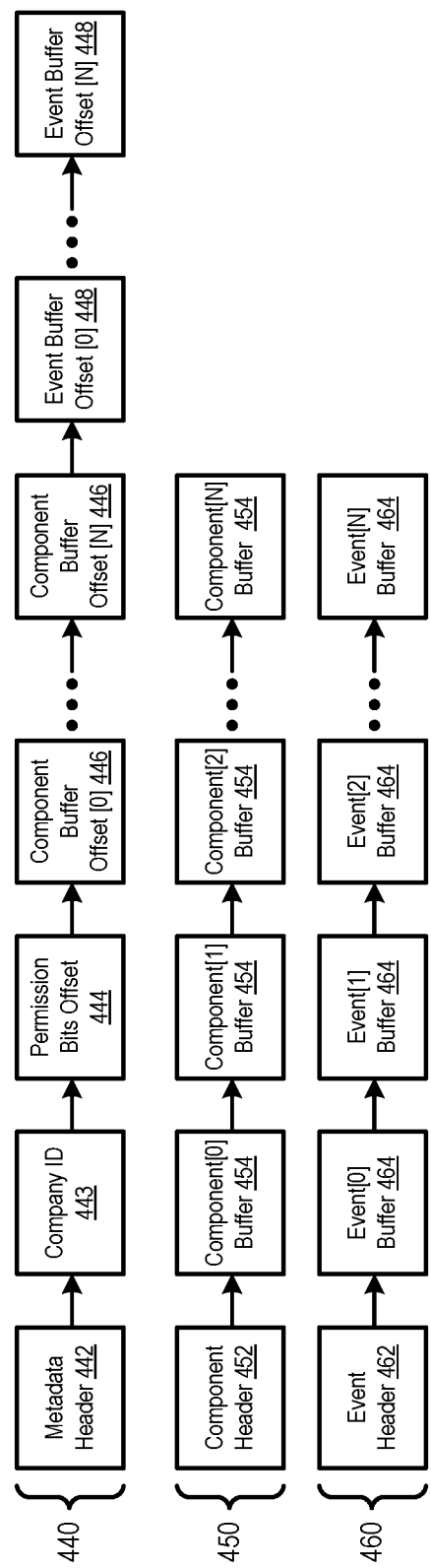
FIG. 4B is a block diagram illustrating one embodiment of linked lists created by the PCA.

After nodes 410, 420 and 430 are generated for each of the system platform components and permission bits are assigned, PCA 200 may divide the generated nodes into a plurality of linked lists comprising a metadata list 440 of metadata nodes 410, a component list 450 of component nodes 420 and an event list 460 of event nodes 430 as shown, for example, in FIGS. 4A and 4B. FIG. 4B illustrates one embodiment of the linked lists, which may be created by PCA 200.

In the embodiment shown in FIG. 4B, the metadata list 440 includes a metadata header 442, a company ID 443, a permission bits offset 444 (identifying a location of the permission bits assigned to the component nodes and event nodes), and a component buffer offset [0 . . . N] 446 and event buffer offset [0 . . . N] 448 (identifying a buffer offset for the component nodes and event nodes) for each of the system platform components [0 . . . N]. The component list 450 shown in FIG. 4B includes a component header 452 and a component buffer [0 . . . N] 446 for each of the system platform components [0 . . . N], wherein the component buffer [0 . . . N] 446 identifies a buffer location for each component node 420. The event list 460 shown in FIG. 4B includes an event header 462 and an event buffer [0 . . . N] 466 for each of the system platform components [0 . . . N], wherein the event buffer [0 . . . N] 466 identifies a buffer location for each event node 430.

In some embodiments, the platform-related information contained within the component nodes 420 and the event nodes 430 may be stored within different non-volatile memory (e.g., NVRAM or SPI Flash) namespaces. In addition, the platform-related information stored within the component nodes 420 and the event nodes 430 may be encrypted and accessed only through the metadata nodes 410 contained within the metadata list 410. The metadata list 410 may be securely stored on the system platform (e.g., within NVRAM) and may be accessed only with administrator privileges. The metadata list 410 is provided to the List Manager (LM) 210 for maintenance. No other module shown in FIG. 2 is aware of the metadata list 410.

The List Manager (LM) 210 shown in FIG. 2 may manage the metadata list 410 in a secure location on the platform. When LM 210 receives a request from a requestor (e.g., an end user, administrator, service center representative, system platform component, software component, etc.) to access platform-related information contained within one or more of the component nodes 420 and event nodes 430, the LM 210 may be executed to verify the user permissions of the requestor with the permission bits assigned to the one or more component nodes 420 and event nodes 430, and may fetch the platform-related information contained within the one or more component nodes 420 and event nodes 430 if the user permissions are verified. Once permissions are verified, LM 210 may use the metadata contained within the metadata nodes 410 to fetch the platform-related information requested by the requestor.

As shown in FIGS. 4A and 4C, the metadata list 440, component list 450 and event list 460 generated by PCA 200 may be provided to BLOB generator 220. BLOB generator 220 may be executed to generate a Binary Large OBject, or BLOB 470, which includes at least a subset of the platform-related information stored within the metadata nodes 410, component nodes 420 and event nodes 430. As shown in FIG. 4C, the BLOB 470 may include multiple parts. For example, a first part of the BLOB 470 ("Part 1") may include the first 3 bits of the company ID 443, the metadata provided in the metadata list 440 and the permission bits assigned to the component nodes 420 and event nodes 430; a second part of the BLOB 470 ("Part 2") may include the component data stored within the component nodes 420; and a third part of the BLOB 470 ("Part 3") may include the event data stored within the event nodes 430.

In some embodiments, BLOB generator 220 may generate the BLOB 470 based on the request received by LM 210 from a requestor requesting access to the platform-related information contained within one or more of the component nodes 420 and event nodes 430, the user permissions of the requestor and the permission bits assigned to the component nodes 420 and event nodes 430.

For example, an administrator or service center representative with user permission 'A' or 'B' may request access to all of the platform-related information contained within the component nodes 420 and events nodes 430. When this occurs, BLOB generator 220 may generate a BLOB 470 containing all three parts (e.g., Part 1, Part 2 and Part 3), as shown in FIG. 4C. However, the user permissions granted to other requestors (e.g., an end user) may be lower.

When an end user with lower user permission requests access to platform-related information, LM 210 may fetch only a subset of the platform-relation information contained within the component nodes 420 and/or the event nodes 430 based on the request received from the end user, the user permissions of the end user and the permission bits assigned to the component nodes 420 and/or the event nodes 430. When this occurs, BLOB generator 220 may generate a BLOB 470 containing only one or two of the parts shown in FIG. 4C. For example, a BLOB 470 created for an end user (or another requestor having user permissions 'C', 'D' or 'E', for example) may contain only the component data and/or event data requested for one or more system platform components.

Figure 4D:
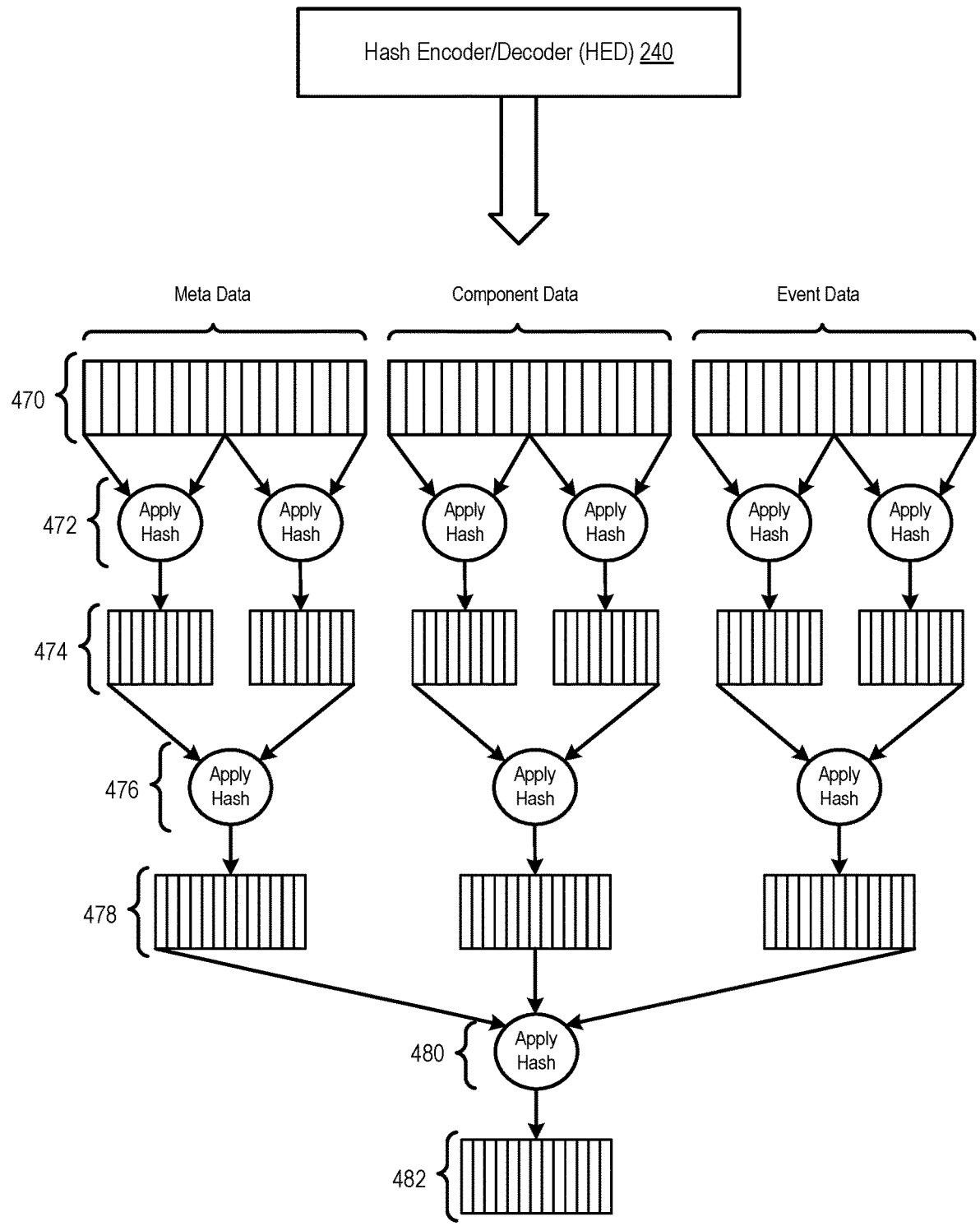
FIG. 4D is a functional block diagram illustrating how the Hash Encoder/Decoder (HED) may encode the BLOB to create a cryptographic key containing the platform-related information collected by the PCA.

After a BLOB 470 is generated based on request, user permissions and permission bits, the Hash Encoder/Decoder (HED) 240 shown in FIG. 2 may be executed to encode the BLOB 470 to create a cryptographic key, which contains the platform-related information included within the BLOB. FIG. 4D illustrates one manner in which HED 240 may encode a BLOB 470 to generate a cryptographic key.

In some embodiments, different parts of the BLOB 470 may be stored within different non-volatile memory locations. For example, the component data contained within the second part of the BLOB 470 and the event data contained within the third part of the BLOB 470 may be randomly stored within a non-volatile memory (NVMe) datastore (e.g., NVRAM or SPI Flash memory) containing a plurality of NVMe namespaces. Information used to locate the NVMe namespaces is provided within the metadata contained within the first part of the BLOB 470. Each time a new cryptographic key is generated (as described in more detail below), the metadata is recreated with redistribution of the component data and the event data amongst the NVMe datastore based on the way the data was fetched and user permissions. The metadata contained within the first part of the BLOB 470 may be encrypted, stored securely on the system platform (e.g., within NVRAM) and accessed only with administrator privileges.

Because the component data and event data are randomly stored in NVMe namespaces, a file system is needed to provide read/write access to the data. The BLOB Data File System (BDFS) 230 shown in FIG. 2 ensures communication between the various NVMe namespaces for reading and writing the component data and event data stored therein. This file system uses its own application program interfaces (APIs), which are not exposed outside of this file system. Examples of APIs used by the BDFS 230 include, but are not limited to:

IdentifyNamespace (IN Component ID, OUT Namespace ID): returns the NVMe namespace where the BLOB data for a given platform system component is stored.
GetComponentData (IN Component ID, IN Namespace ID, OUT Data Buffer): fetches the BLOB data from a given NVMe namespace.
GetComponentData (IN Component ID, IN Namespace ID, IN Data Buffer): writes the BLOB data into a specified NVMe namespace.

FIG. 4D illustrates how the Hash Encoder/Decoder (HED) 240 shown in FIG. 2 may encode the BLOB 470 to create a cryptographic key, which contains the platform-related information 400 included within the BLOB 470. As noted above, the platform-related information 400 included within the BLOB 470 may be based on request and user permissions, and thus, each BLOB may contain one or more of the parts (e.g., Part 1, Part 2 and/or Part 3) shown in FIG. 4C. In the example embodiment shown in FIG. 4D, the BLOB 470 includes a first part containing metadata, a second part containing component data and a third part containing event data. In other embodiments (not shown), BLOB generator 220 may generate a BLOB containing only one or two of the parts shown in FIG. 4C.

In some embodiments, HED 240 may encode the BLOB 470 by dividing the BLOB into multiple parts, such as a first part containing metadata, a second part containing component data and a third part containing event data. After the BLOB 470 is divided into multiple parts, HED 240 may divide each part into multiple sub-parts. In some embodiments, each part may be divided into a particular number of sub-parts (e.g., 2 sub-parts, as shown in FIG. 4D). In other embodiments, sub-parts may be generated such that each sub-part contains metadata, component data or event data for a given system platform component.

After the BLOB 470 is divided into multiple sub-parts, HED 240 may apply a hash algorithm 472 to each sub-part to generate a first set of hash strings 474. Next, HED 240 may combine two or more of the hash strings in the first set of hash strings 474 and apply a hash algorithm 476 to the combined hash strings to generate a second set of hash strings 478. The process may continue until a final hash string is generated. In the illustrated embodiment, HED 240 combines the second set of hash strings 478 and applies a hash algorithm 480 to the combined hash strings to generate a final hash string 482, which contains the metadata, component data and the event data included within the BLOB 470. It is recognized that the encoding process shown in FIG. 4D is merely exemplary and may contain a greater or lesser number of steps to generate a final hash string 482 containing the platform-related information 400 included within the BLOB 470. Once a final hash string 482 generated, it may be encrypted to generate a cryptographic key. In some embodiments, the cryptographic key may be stored locally within the IHS 100 (e.g., within SPI Flash memory 154).

In some embodiments, a new cryptographic key may be generated each time the IHS 100 is rebooted to track changes made to the system platform components and/or events associated with the system platform components. Each time the IHS is rebooted, PCA 200 may collect platform-related information 400 (including component data and/or event data) from a plurality of system platform components, use the platform-related information 400 to generate a metadata node 410, a component node 420 and an event node 430 for each system platform component, assign permission bits to the generated nodes and divide the generated nodes into a plurality of linked lists. The plurality of linked lists may then be provided to the BLOB generator 220 to generate a new BLOB 470 based on request and user permissions. After the new BLOB 470 is generated, HED 240 may encode the new BLOB 470 to create a new cryptographic key. The new cryptographic key may be compared with the previously generated cryptographic key to track changes made to the system platform components and/or events associated with the system platform components.

Like BDFS 230, HED 240 may use various APIs for encoding platform-related information into a cryptographic key, and decoding the cryptographic key to obtain platform-related information for a requested system platform component. Examples of APIs used by the HED 240 include, but are not limited to:

GetComponent (IN Component ID, OUT Buffer): decodes the cryptographic key and fetches the platform-related information stored in the buffer for a requested system platform component specified by the Component ID.

SetComponent (IN Component ID, IN Buffer): stores platform-related information corresponding to a system platform component specified by the Component ID within a buffer after decoding the cryptographic key and recalculating the hash.

In some embodiments, the APIs utilized by HED 240 may check the user permissions of the requestor first, and may return if the requestor does not have enough privileges to access the requested platform-related information. The APIs utilized by HED 240 may also interact with BDFS 230 to fetch the platform-related information from different NVMe namespaces.

The IHS 100 shown in FIGS. 1-4D improves upon conventional information handling systems by collecting and embedding a plurality of platform-related information within a single, trusted identifier (e.g., a single cryptographic key), which can be used to verify system platform configuration to a requestor (e.g., an end user, administrator, service center representative, system platform component, software/firmware component, etc.), determine if changes have been made to the system platform components, facilitate system diagnostics and/or perform additional functions. In some embodiments, a hardware or software component of the IHS 100 (or another requestor) may compare the cryptographic key generated at the most recent system boot with a previously generated cryptographic key to verify the hardware and software components on the system platform. If the keys match, the hardware or software component of the IHS 100 (or the requestor) may confirm that the system configuration is accurate.

The cryptographic keys described herein may also be used to track changes made to the system platform components. When a hardware or software component on the system platform is changed and the IHS 100 is rebooted, PCA 200 may collect information about the new hardware/software component (including, e.g., a new component ID), generate a new metadata node 410, component node 420 and event node 430 for the new hardware/software component, and may update the metadata list 440, component list 450 and event list 460, which are provided to the BLOB generator 220 to generate a new BLOB 470. The new BLOB 470 may then be encoded by HED 240 to create a new cryptographic key. When the new cryptographic key and the previously generated cryptographic key are subsequently decrypted and compared, the new component ID corresponding to the new hardware/software component will not match the component ID included within the previously generated cryptographic key. This enables the IHS 100 to track changes made to the system platform components.

The cryptographic keys described herein may also be used to track events associated with the system platform components. When a failure event (e.g., a bad memory block) is discovered during POST for a system platform component, the failure event is collected by the PCA 200 and bundled into the event node 430 corresponding to the system platform component. The event node 430 including the failure event is added to the BLOB 470, which is encoded by HED 240 to create a new cryptographic key. The failure event may be detected when the new cryptographic key is decoded. In some embodiments, the cryptographic key may be decoded by a hardware or software component of the IHS 100 to perform failure event processing. In other embodiments, the cryptographic key may be transmitted to a remote system 194 or service (e.g., a cloud service, a remote support service, an IT department or administrator system, a mobile device, etc.) to perform failure event processing or facilitate system diagnostics.

The cryptographic keys described herein may also be used to perform other functions. In one example, a cryptographic key may be generated and decoded using the techniques described herein to obtain a chipset reference code version needed for remediation and security determinations. In another example, a cryptographic key may be generated and decoded using the techniques described herein to obtain platform-related information needed to calibrate a virtual machine or container. A skilled artisan would readily understand how the cryptographic key generation techniques described herein may be utilized for other purposes.

By embedding platform-related information into a single cryptographic key, the IHS 100 shown in FIGS. 1-4D provides a cost effective, one stop solution to perform secure verification system platform components and perform other functions. Unlike conventional methods, which use digital certificates to track system platform configuration, the IHS 100 shown in FIGS. 1-4D reduces operating costs by using firmware components (e.g., PCA 200, BLOB generator 220 and HED 240), which are locally stored and executed on the IHS 100, to generate a cryptographic key containing a wide variety of platform-related information.

Figure 5:
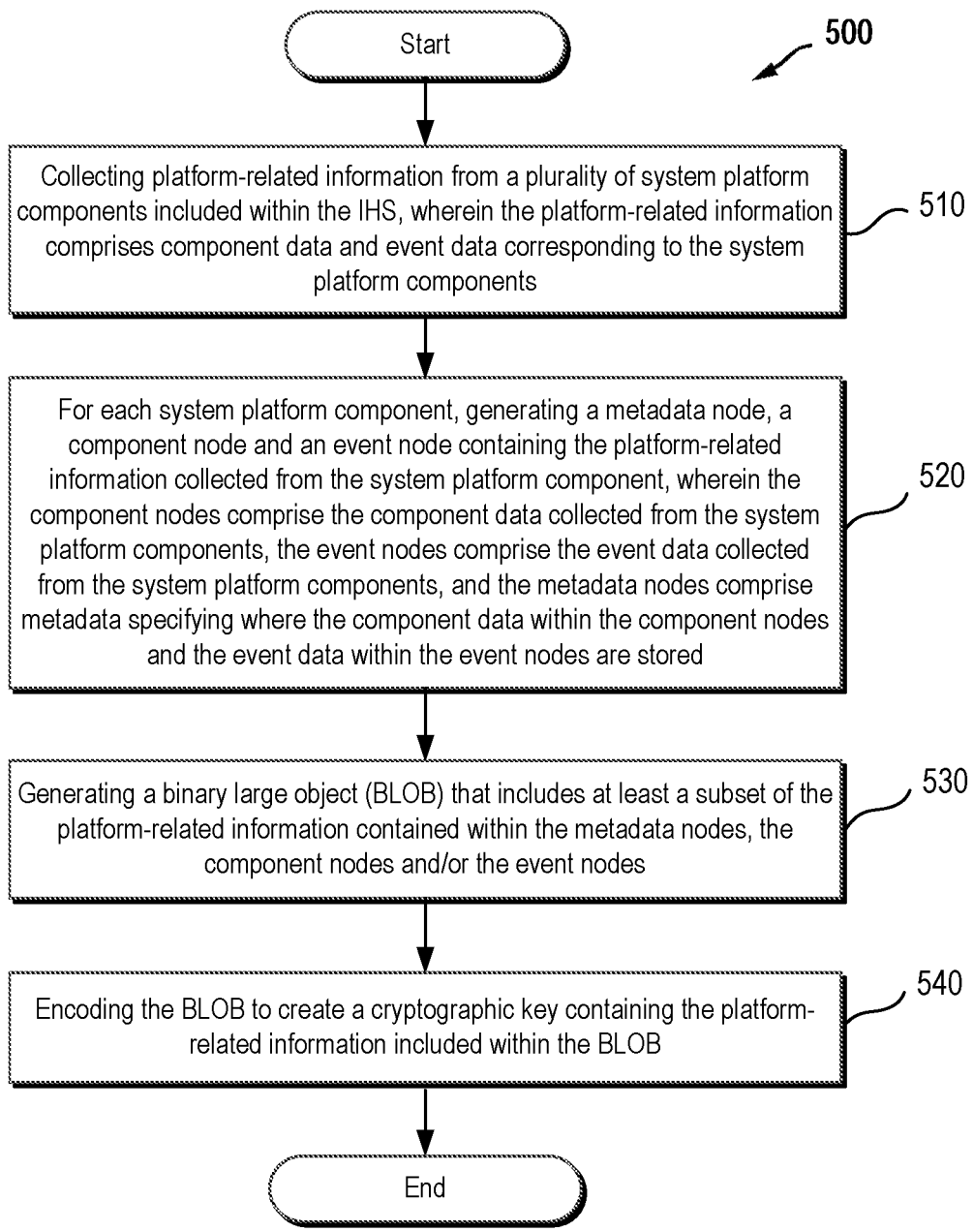
FIG. 5 is a flowchart diagram illustrating one embodiment of a method that utilizes the techniques described herein.

FIG. 5 illustrates one embodiment of a method 500 that utilizes the techniques described herein to generate a cryptographic key, which may be used to cryptographically verify information handling system platform components and track events associated with the platform components. The method 500 shown in FIG. 5 is a computer implemented method performed by a processing device of an information handling system (IHS) executing program instructions contained within boot services stored within a computer readable memory of the IHS. In one example, the computer implemented method 500 shown in FIG. 5 may be performed by EC 180 executing program instructions contained within one or more of the boot services shown in FIG. 2 (e.g., one or more of PCA 200, LM 210, BLOB generator 220, BDFS 230 and HED 240).

It will be recognized that the embodiment shown in FIG. 5 is merely exemplary and additional methods may utilize the techniques described herein. Further, additional steps may be added to the method shown in the FIG. 5 as the steps described are not intended to be exclusive. Moreover, the order of the steps is not limited to the order shown in FIG. 5 as different orders may occur and/or various steps may be performed in combination or at the same time.

In some embodiments, the computer implemented method 500 shown in FIG. 5 may begin by collecting platform-related information from a plurality of system platform components included within the IHS (in step 510). The platform-related information collected in step 510 may generally include component data and event data corresponding to the system platform components. In some embodiments, additional platform-related information may be collected in step 510, as set forth above.

In step 520, the computer implemented method 500 includes, for each system platform component, generating a metadata node, a component node and an event node containing the platform-related information collected from the system platform component. As noted above, the component nodes may include the component data collected from the system platform components, the event nodes may include the event data collected from the system platform components, and the metadata nodes may include metadata specifying where the component data within the component nodes and the event data within the event nodes are stored.

In step 530, the computer implemented method 500 includes generating a binary large object (BLOB) that includes at least a subset of the platform-related information contained within the metadata nodes, the component nodes and/or the event nodes. In some embodiments, the BLOB generated in step 530 may be based on: user permissions of a requestor requesting access to the platform-related information contained within one or more of the component nodes and the event nodes; and permission bits assigned to the one or more of the component nodes and the event nodes.

In step 540, the computer implemented method 500 includes encoding the BLOB to create a cryptographic key containing the platform-related information included within the BLOB. In some embodiments, step 540 may be performed by: dividing the BLOB into multiple parts including a first part containing the metadata, a second part containing the component data and a third part containing the event data; dividing each of the multiple parts into multiple sub-parts; applying a hash algorithm to each of the multiple sub-parts to generate a set of hash strings; combining two or more hash strings in the set of hash strings and applying a hash algorithm to the combined hash strings to generate another set of hash strings; repeating the step of combining two or more hash strings and applying a hash algorithm to the combined hash strings until a final hash string is generated; and encrypting the final hash string to create the cryptographic key.

The computer implemented method 500 disclosed herein is not strictly limited to the method steps shown in FIG. 5 may include additional and/or alternative method steps. For example, some embodiments of the computer implemented method 500 may further include: storing the metadata contained within metadata nodes in a secure location on a system platform of the IHS; encrypting the platform-related information contained within the component nodes and the event nodes; storing the encrypted platform-related information within different non-volatile memory namespaces; and accessing the encrypted platform-related information stored within different non-volatile memory namespaces only through the metadata nodes.

In some embodiments, the computer implemented method 500 may include assigning permission bits to the component nodes and the event nodes, wherein the permission bits specify user permissions for accessing the platform-related information contained within the component nodes and the event nodes.

In some embodiments, the computer implemented method 500 may further include receiving a request from a requestor to access platform-related information stored within one or more of the component nodes and the event nodes; verifying the user permissions of the requestor with the permission bits assigned to the one or more of the component nodes and the event nodes; and fetching the platform-related information stored within the one or more of the component nodes and the event nodes if the user permissions are verified. In such embodiments, the BLOB generated in step 530 may be based on: the request received from the requestor, the user permissions of the requestor and the permission bits assigned to the one or more of the component nodes and the event nodes.

In some embodiments, the computer implemented method 500 may further include repeating the steps of collecting platform-related information, generating a metadata node, a component node and an event node, generating a BLOB and encoding the BLOB each time the IHS is rebooted to create a new cryptographic key. In some embodiments, the computer implemented method 500 may further include comparing the new cryptographic key with the cryptographic key to verify the system platform components and/or track changes made to the system platform components. In other embodiments, the computer implemented method 500 may further include comparing the new cryptographic key with the cryptographic key to track events associated with the system platform components.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. An information handling system (IHS), comprising:
   a first boot service stored within a non-transitory computer readable memory of the IHS and executable by a processing device of the IHS to:
      collect platform-related information from a plurality of system platform components included within the IHS, wherein the platform-related information comprises component data and event data corresponding to the system platform components;
      for each system platform component, generate a metadata node, a component node and an event node containing the platform-related information collected from the system platform component, wherein the component nodes comprise the component data collected from the system platform components, the event nodes comprise the event data collected from the system platform components, and the metadata nodes comprise metadata specifying where the component data within the component nodes and the event data within the event nodes are stored;
   a second boot service stored within the non-transitory computer readable memory of the IHS and executable by the processing device of the IHS to generate a binary large object (BLOB) that includes at least a subset of the platform-related information contained within the metadata nodes, the component nodes and/or the event nodes; and
   a third boot service stored within the non-transitory computer readable memory of the IHS and executable by the processing device of the IHS to encode the BLOB to create a cryptographic key containing the platform-related information included within the BLOB.

2. The information handling system of claim 1, wherein the metadata contained within metadata nodes is stored in a secure location on a system platform of the IHS, and wherein the platform-related information contained within the component nodes and the event nodes is encrypted, stored within different non-volatile memory namespaces and accessed only through the metadata nodes.

3. The information handling system of claim 1, wherein the second boot service is further executable by the processing device of the IHS to generate the BLOB based on:
   user permissions of a requestor requesting access to the platform-related information contained within one or more of the component nodes and the event nodes; and
   permission bits assigned to the one or more of the component nodes and the event nodes.

4. The information handling system of claim 1, wherein the first boot service is further executable by the processing device of the IHS to assign permission bits to the component nodes and the event nodes, wherein the permission bits specify user permissions for accessing the platform-related information contained within the component nodes and the event nodes.

5. The information handling system of claim 4, further comprising a fourth boot service stored within the non-transitory computer readable memory of the IHS and executable by the processing device of the IHS to:
   receive a request from a requestor to access platform-related information stored within one or more of the component nodes and the event nodes;
   verify the user permissions of the requestor with the permission bits assigned to the one or more of the component nodes and the event nodes; and
   fetch the platform-related information stored within the one or more of the component nodes and the event nodes if the user permissions are verified.

6. The information handling system of claim 5, wherein the second boot service is further executable by the processing device of the IHS to generate the BLOB based on:
   the request received from the requestor;
   the user permissions of the requestor; and
   the permission bits assigned to the one or more of the component nodes and the event nodes.

7. The information handling system of claim 1, wherein the third boot service is executable by the processing device of the IHS to encode the BLOB to create a cryptographic key by:
   dividing the BLOB into multiple parts including a first part containing the metadata, a second part containing the component data and a third part containing the event data;
   dividing each of the multiple parts into multiple sub-parts;
   applying a hash algorithm to each of the multiple sub-parts to generate a set of hash strings;
   combining two or more hash strings in the set of hash strings and applying a hash algorithm to the combined hash strings to generate another set of hash strings;
   repeating the step of combining two or more hash strings and applying a hash algorithm to the combined hash strings until a final hash string is generated; and
   encrypting the final hash string to create the cryptographic key.

8. The information handling system of claim 1, wherein the first boot service, the second boot service and the third boot service are executed by the processing device every time the IHS is rebooted to create a new cryptographic key.

9. The information handling system of claim 8, wherein the new cryptographic key is compared with the cryptographic key to verify the system platform components and/or track changes made to the system platform components.

10. The information handling system of claim 8, wherein the new cryptographic key is compared with the cryptographic key to track events associated with the system platform components.

11. A computer implemented method performed by a processing device of an information handling system (IHS) executing program instructions contained within boot services stored within a non-transitory computer readable memory of the IHS, wherein the computer implemented method comprises:
   collecting platform-related information from a plurality of system platform components included within the IHS, wherein the platform-related information comprises component data and event data corresponding to the system platform components;
   for each system platform component, generating a metadata node, a component node and an event node containing the platform-related information collected from the system platform component, wherein the component nodes comprise the component data collected from the system platform components, the event nodes comprise the event data collected from the system platform components, and the metadata nodes comprise metadata specifying where the component data within the component nodes and the event data within the event nodes are stored;
   generating a binary large object (BLOB) that includes at least a subset of the platform-related information contained within the metadata nodes, the component nodes and/or the event nodes; and
   encoding the BLOB to create a cryptographic key containing the platform-related information included within the BLOB.

12. The computer implemented method of claim 11, further comprising:
   storing the metadata contained within metadata nodes in a secure location on a system platform of the IHS;
   encrypting the platform-related information contained within the component nodes and the event nodes;
   storing the encrypted platform-related information within different non-volatile memory namespaces; and
   accessing the encrypted platform-related information stored within different non-volatile memory namespaces only through the metadata nodes.

13. The computer implemented method of claim 11, wherein said generating a BLOB comprises generating the BLOB based on:
   user permissions of a requestor requesting access to the platform-related information contained within one or more of the component nodes and the event nodes; and
   permission bits assigned to the one or more of the component nodes and the event nodes.

14. The computer implemented method of claim 11, further comprising assigning permission bits to the component nodes and the event nodes, wherein the permission bits specify user permissions for accessing the platform-related information contained within the component nodes and the event nodes.

15. The computer implemented method of claim 14, further comprising:

receiving a request from a requestor to access platform-related information stored within one or more of the component nodes and the event nodes;

verifying the user permissions of the requestor with the permission bits assigned to the one or more of the component nodes and the event nodes; and fetching the platform-related information stored within the one or more of the component nodes and the event nodes if the user permissions are verified.

16. The computer implemented method of claim 15, wherein said generating a BLOB comprises generating the BLOB based on:

the request received from the requestor;

the user permissions of the requestor; and the permission bits assigned to the one or more of the component nodes and the event nodes.

17. The computer implemented method of claim 11, wherein said encoding the BLOB to create a cryptographic key comprises:

dividing the BLOB into multiple parts including a first part containing the metadata, a second part containing the component data and a third part containing the event data;

dividing each of the multiple parts into multiple sub-parts;

applying a hash algorithm to each of the multiple sub-parts to generate a set of hash strings;

combining two or more hash strings in the set of hash strings and applying a hash algorithm to the combined hash strings to generate another set of hash strings;

repeating the step of combining two or more hash strings and applying a hash algorithm to the combined hash strings until a final hash string is generated; and encrypting the final hash string to create the cryptographic key.

18. The computer implemented method of claim 11, further comprising repeating the steps of collecting platform-related information, generating a metadata node, a component node and an event node, generating a BLOB and encoding the BLOB each time the IHS is rebooted to create a new cryptographic key.

19. The computer implemented method of claim 18, further comprising comparing the new cryptographic key with the cryptographic key to verify the system platform components and/or track changes made to the system platform components.

20. The computer implemented method of claim 18, further comprising comparing the new cryptographic key with the cryptographic key to track events associated with the system platform components.

* * * * *